(12) United States Patent
Dighde et al.

(10) Patent No.: US 10,545,541 B1
(45) Date of Patent: Jan. 28, 2020

(54) HINGED DEVICE

(71) Applicant: Microsoft Technology Licensing, LLC, Redmond, WA (US)

(72) Inventors: Rajesh Dighde, Redmond, WA (US); Kabir Siddiqui, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/404,592

(22) Filed: May 6, 2019

(51) Int. Cl.
*G06F 1/16* (2006.01)
*E05D 3/18* (2006.01)
*E05D 3/12* (2006.01)

(52) U.S. Cl.
CPC .......... *G06F 1/1681* (2013.01); *E05D 3/122* (2013.01); *E05D 3/18* (2013.01); *G06F 1/1616* (2013.01); *G06F 1/1652* (2013.01); *E05Y 2900/606* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,176,535 B2 * | 11/2015 | Bohn | .................... | G06F 1/1641 |
| 9,250,733 B2 * | 2/2016 | Lee | ........................ | H04M 1/02 |
| 9,348,450 B1 * | 5/2016 | Kim | ...................... | G06F 1/1681 |
| 9,477,269 B2 * | 10/2016 | Morrison | .............. | G06F 1/1681 |
| 9,557,771 B2 * | 1/2017 | Park | ...................... | G06F 1/1641 |
| 9,857,849 B1 * | 1/2018 | Siddiqui | .............. | G06F 1/1616 |
| 10,227,808 B2 * | 3/2019 | Siddiqui | .................. | E05F 3/20 |
| 10,241,548 B2 * | 3/2019 | Tazbaz | ................. | G06F 1/1681 |
| 10,296,044 B2 * | 5/2019 | Siddiqui | .............. | H04M 1/022 |
| 10,306,783 B2 * | 5/2019 | Seo | ............... | H04M 1/0216 |
| 10,306,788 B2 * | 5/2019 | Bi | ............................ | G02F 1/13 |
| 10,344,510 B2 * | 7/2019 | Siddiqui | | |
| 2015/0153787 A1 * | 6/2015 | Mok | ..................... | G06F 1/1652 |
| | | | | 361/679.27 |
| 2016/0378203 A1 * | 12/2016 | Kim | ..................... | G06F 1/1616 |
| | | | | 345/156 |
| 2017/0060188 A1 * | 3/2017 | Han | ..................... | G06F 1/1652 |
| 2017/0145724 A1 * | 5/2017 | Siddiqui | .............. | E05F 1/1284 |
| 2018/0292860 A1 * | 10/2018 | Siddiqui | .............. | G06F 1/1618 |
| 2019/0005857 A1 * | 1/2019 | Wakata | ................... | G09F 9/301 |
| 2019/0082544 A1 * | 3/2019 | Park | .................... | H05K 5/0017 |
| 2019/0094917 A1 * | 3/2019 | Schmelzle | ............. | F16C 11/04 |

* cited by examiner

*Primary Examiner* — Lisa Lea-Edmonds
(74) *Attorney, Agent, or Firm* — Rainier Patents, P.S.

(57) ABSTRACT

The description relates to hinged devices. One example relates to a device that has hinged first and second portions and a flexible display positioned over the first and second portions. The example can include a cord that determines a length of the hinged first and second portions relative to the flexible display depending on an orientation of the first and second portions. The example can also include a cam that controls a position of a support under the flexible display depending on the orientation.

20 Claims, 13 Drawing Sheets

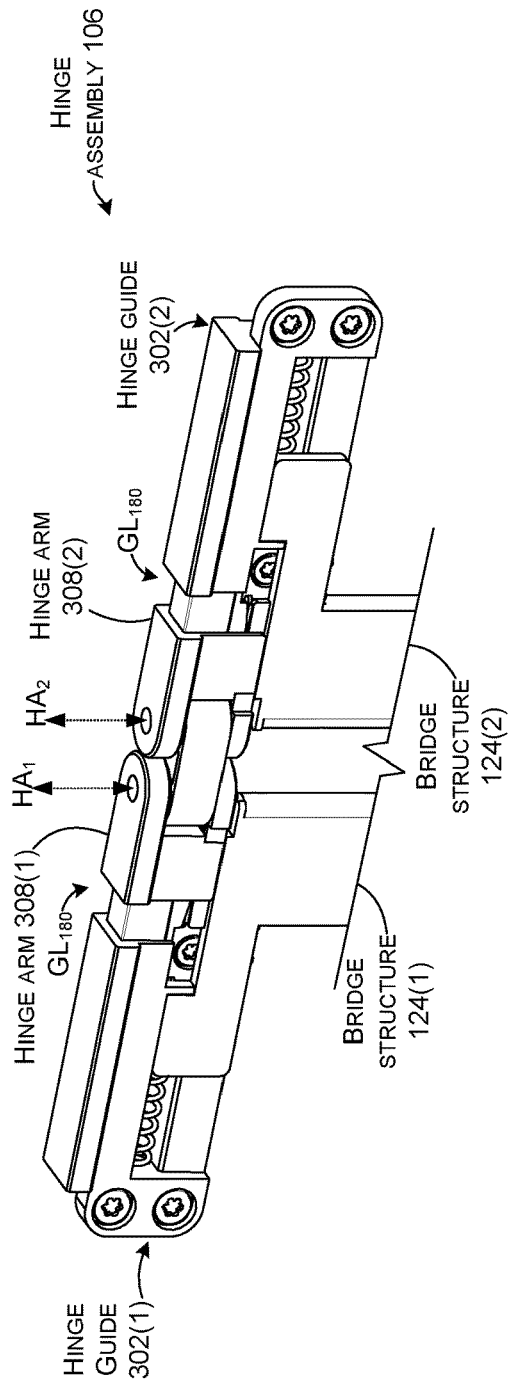
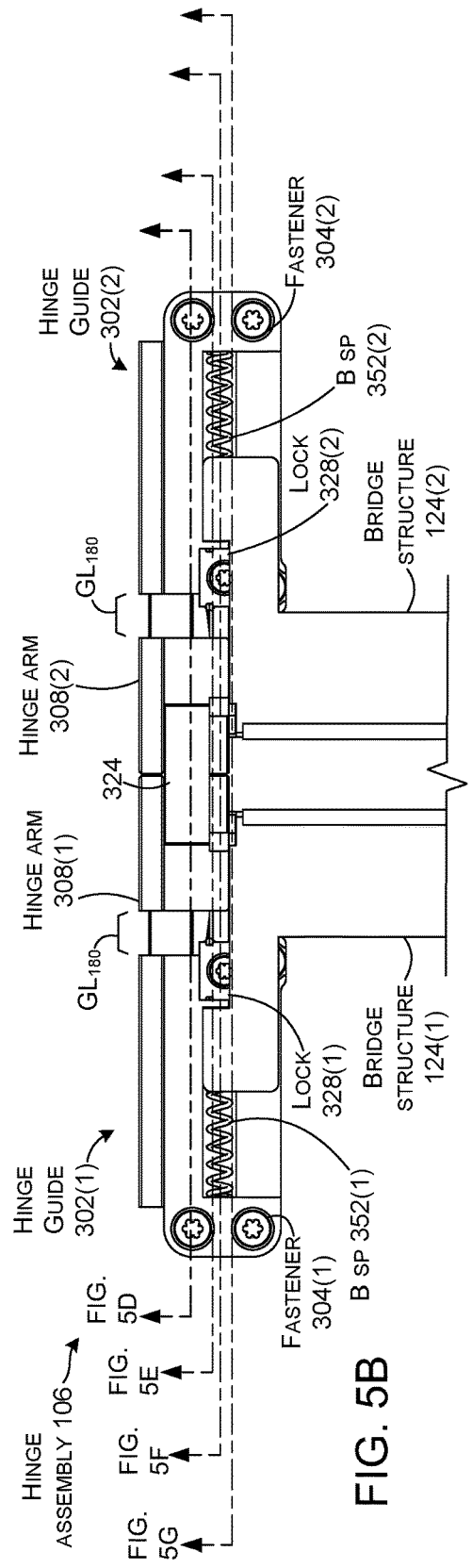
FIG. 5A
FIG. 5B

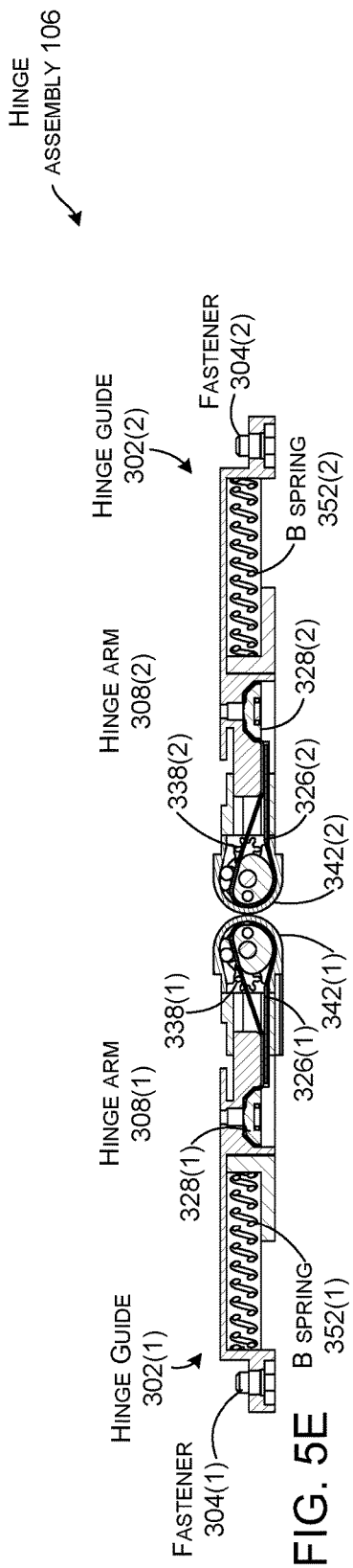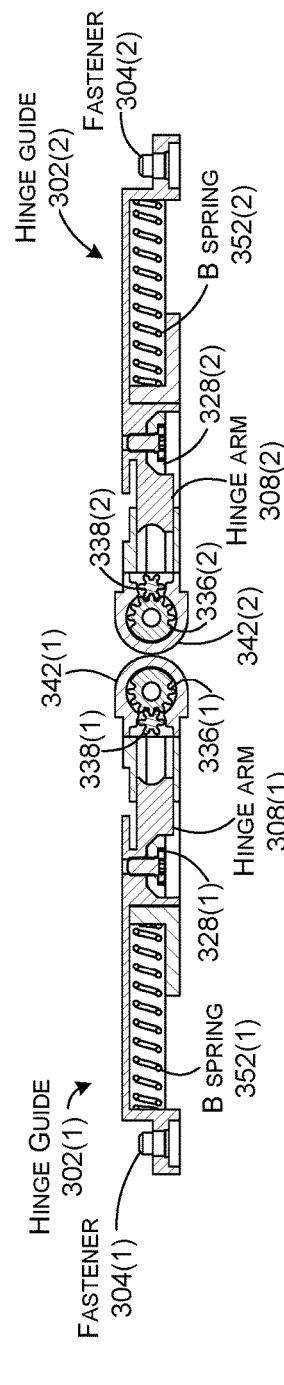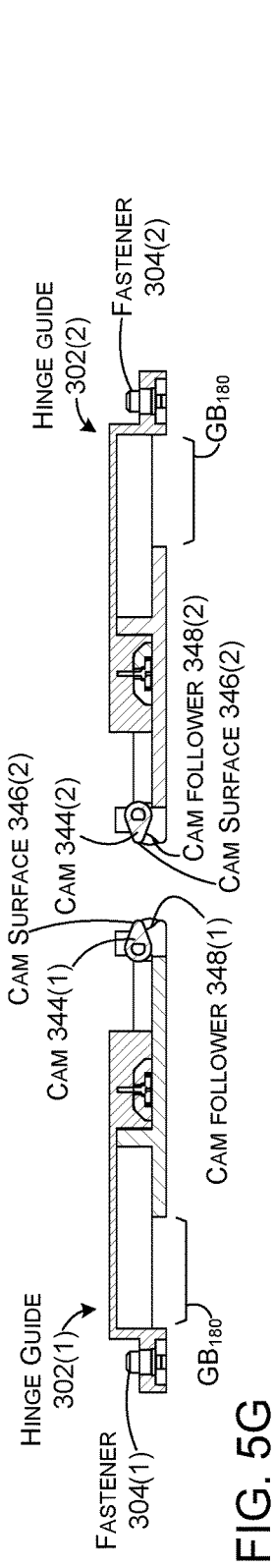

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

FIGS. 2, 4A, 5A, and 6A show perspective views of example devices in accordance with some implementations of the present concepts.

FIGS. 4B, 4C, 5B, 5C, 6B, and 6C show elevational views of example devices in accordance with some implementations of the present concepts.

FIGS. 4D-4G, 5D-5G, and 6D-6G show sectional views of example devices in accordance with some implementations of the present concepts.

DESCRIPTION

The present concepts relate to devices, such as computing devices employing hinge assemblies that can rotationally secure first and second device portions. A flexible display can be secured to both the first and second portions. The hinge assembly can provide several features that facilitate the use of a single flexible display across both portions. During rotation of the first and second portions, the hinge assembly can change the effective length of the device that lies beneath the flexible display to reduce stresses imparted on the flexible display. This aspect can be achieved with a cord that connects the first portion to the hinge assembly. A length of a pathway of the cord (e.g., cord pathway) can change during the rotation so that the cord draws the first portion toward the hinge assembly and/or allows the first portion to be biased away from the hinge assembly depending on the orientation. Another aspect relates to a deployable bridge support that can support the flexible display in some orientations. The deployment of the bridge support can be controlled by a cam that can operate independently of the cord.

Figure 1:
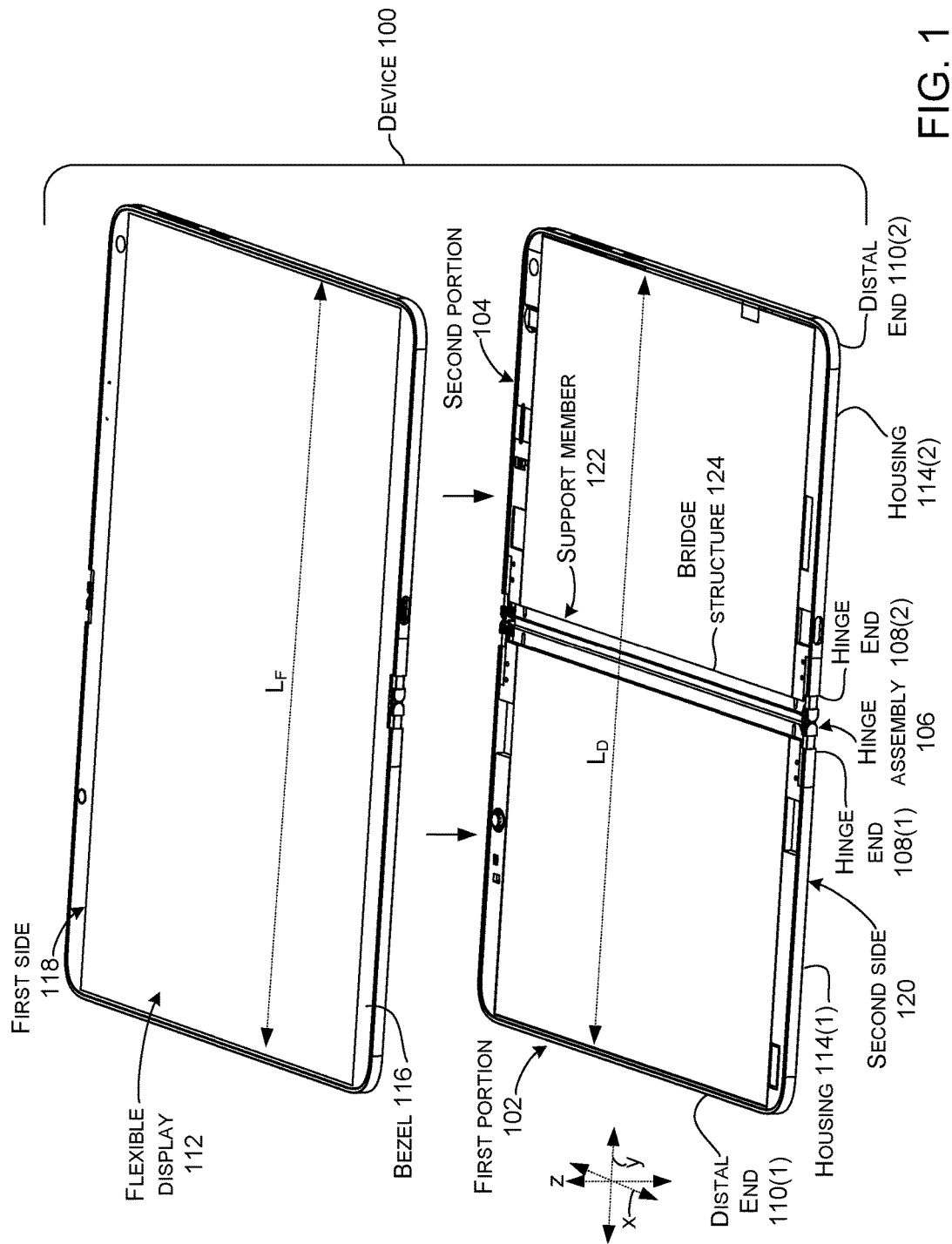
FIGS. 1 and 3A-3B show exploded perspective views of example devices in accordance with some implementations of the present concepts.

Introductory FIG. 1 shows an example device 100 that has first and second portions 102 and 104 that are rotatably secured together by a hinge assembly 106.

The first portion 102 and the second portion 104 can extend from a hinge end 108 to a distal end 110. A flexible display 112 can be positioned over the first portion 102, the hinge assembly 106, and the second portion 104. An example flexible display that is commercially available is an organic light emitting diode (OLED) display, though other types may be available and/or become available. The flexible display 112 can be secured to a housing 114 of both the first and second portions at a bezel 116. For purposes of explanation, the device can be described as having a first side or surface 118 (facing upwardly in FIG. 1) upon which the flexible display 112 is positioned and a second opposite side or surface 120 (facing downwardly in FIG. 1).

A support member 122, such as a deployable bridge structure 124 (shown in ghost because it underlies the flexible display 112) can be positioned between the flexible display 112 and the hinge assembly 106. The support member 122 can support the flexible display 112 over the hinge assembly 106.

Figure 2:
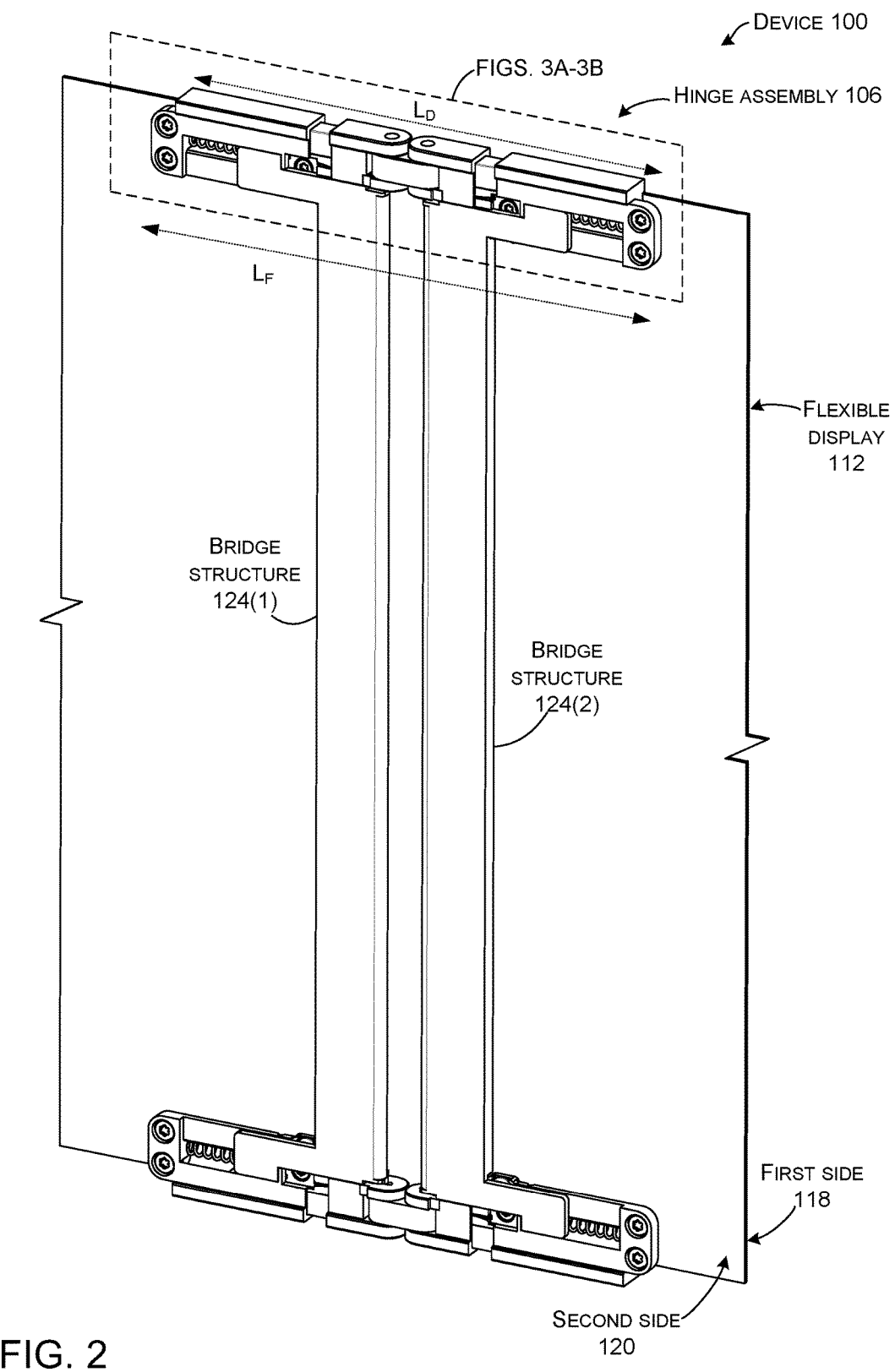

In the illustrated case, the deployable bridge structure 124 can be positioned between the flexible display 112 and the hinge assembly (106, FIGS. 1 and 2). In the open orientation of FIG. 1, the deployable bridge structure 124 can function to support the flexible display 112 over the hinge assembly 106 to create a uniform tactile feel across the device 100. Stated another way, without the deployable bridge structure 124, the flexible display might feel 'mushy' to the user over the hinge assembly 106 and solid over the first and second portions 102 and 104.

The flexible display 112 can be fixedly secured to both the first and second portions 102 and 104. The flexible display 112 can have a length $L_F$. The portion of the device 100 underlying the flexible display 112 can have a length $L_D$. To facilitate the fixedly secured configuration, the hinge assembly 106 can change the length $L_D$ of the device 100 (e.g., effective length) underlying the flexible display at various orientations of the rotation to reduce forces being imparted on the flexible display 112. Briefly, at the 180-degree orientation of FIG. 1, the length of the device $L_D$ and the length of the flexible display $L_F$ are approximately equal. The flexible display 112 tends to be above the neutral axis of the device. As such, during rotation the length of the flexible display 112 would traditionally have to change during rotation. Instead, in the present implementations, the hinge assembly 106 (e.g., the device) can change length $L_D$ during rotation to accommodate the flexible display. This aspect will be discussed in more detail below relative to FIGS. 4A-6G.

FIG. 2 shows regions of the first and second portions 102 and 104 joined to the hinge assembly 106 and oriented at 180-degrees. In this view, the second surface or side 120 is facing toward the reader and the first side 119 is facing away from the reader. In this case, there are two deployable bridge structures 124(1) and 124(2) associated with the first and second portions 102 and 104, respectively. The deployable bridge structures 124 can be deployed to a position that supports the flexible display at the hinge assembly 106 in the illustrated 180-degree position.

Further, independent of the position of the bridge structures 124, the length of the device ($L_D$) underlying the flexible display 112 (e.g., length $L_F$) can be adjusted depending on the orientation. In the illustrated 180-degree orientation the length of the device $L_D$ is relatively long. In other orientations, such as the zero-degree orientation and the 360-degree orientation, the length of the device $L_D$ can be relatively shorter to reduce stresses imparted on the flexible display.

In this case, the deployable bridge structures 124 can be deployed over the hinge assembly 106 in the 180-degree orientation. The deployable bridge structures 124 can support the flexible display 112. The support offered by the bridge structures 124 can contribute to tactile symmetry across the flexible display 112 over the first portion 102, the hinge assembly 106, and the second portion 104 in the 180-degree orientation. Stated another way, the flexible display can feel substantially the same to the user across the entire device 100, such as when the user touches the flexible display as an input command.

When the first and second portions 102 and 104 are rotated to other orientations (e.g., less than or more than 180 degrees) the deployable bridge structures 124 can move to allow room for the flexible display to bend at the hinge assembly 106.

FIGS. 3A-3B, 4A-4G, 5A-5G, and 6A-6G collectively show more details of hinge assembly 106.

Figure 3A:
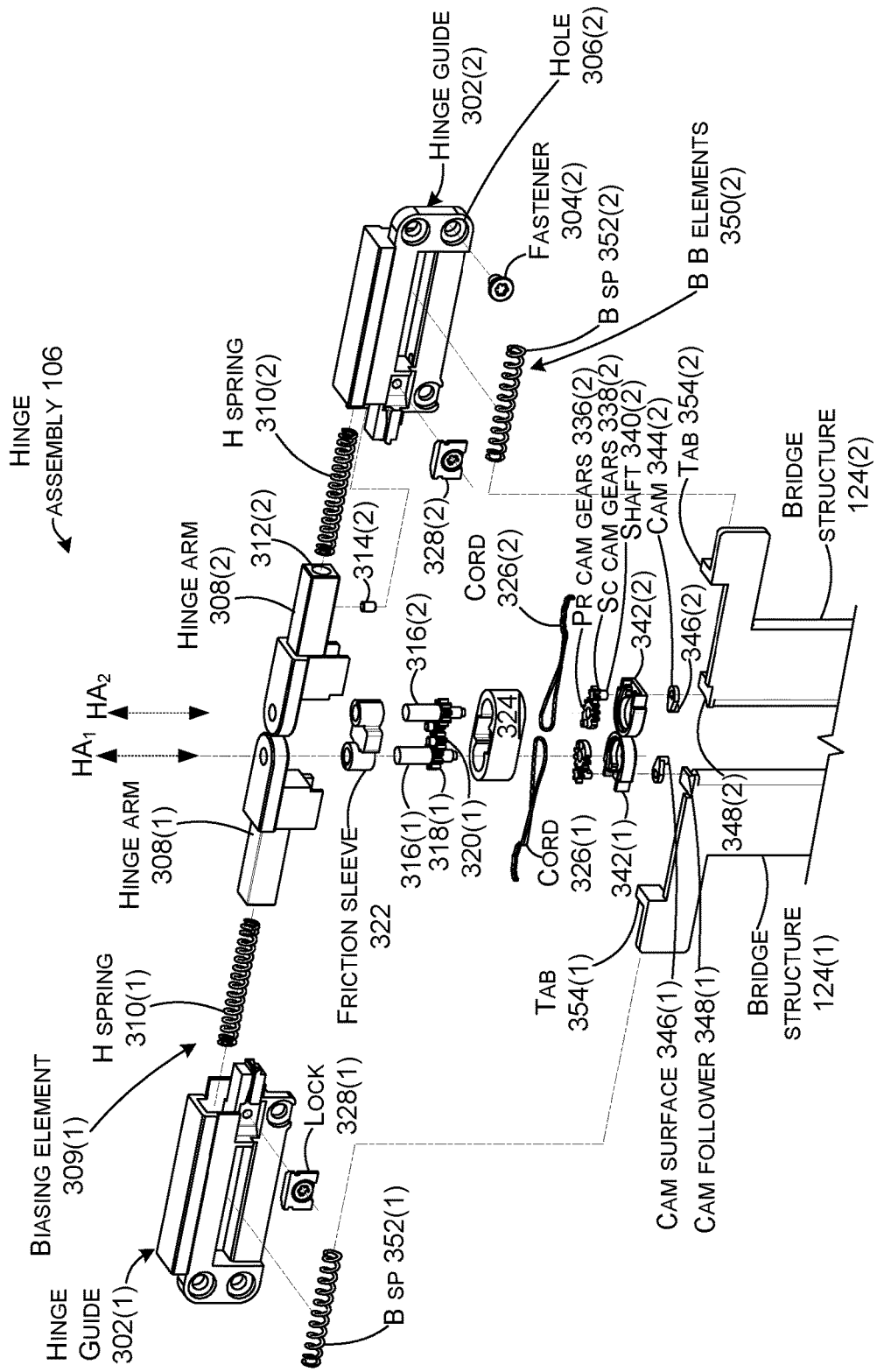
Figure 3B:
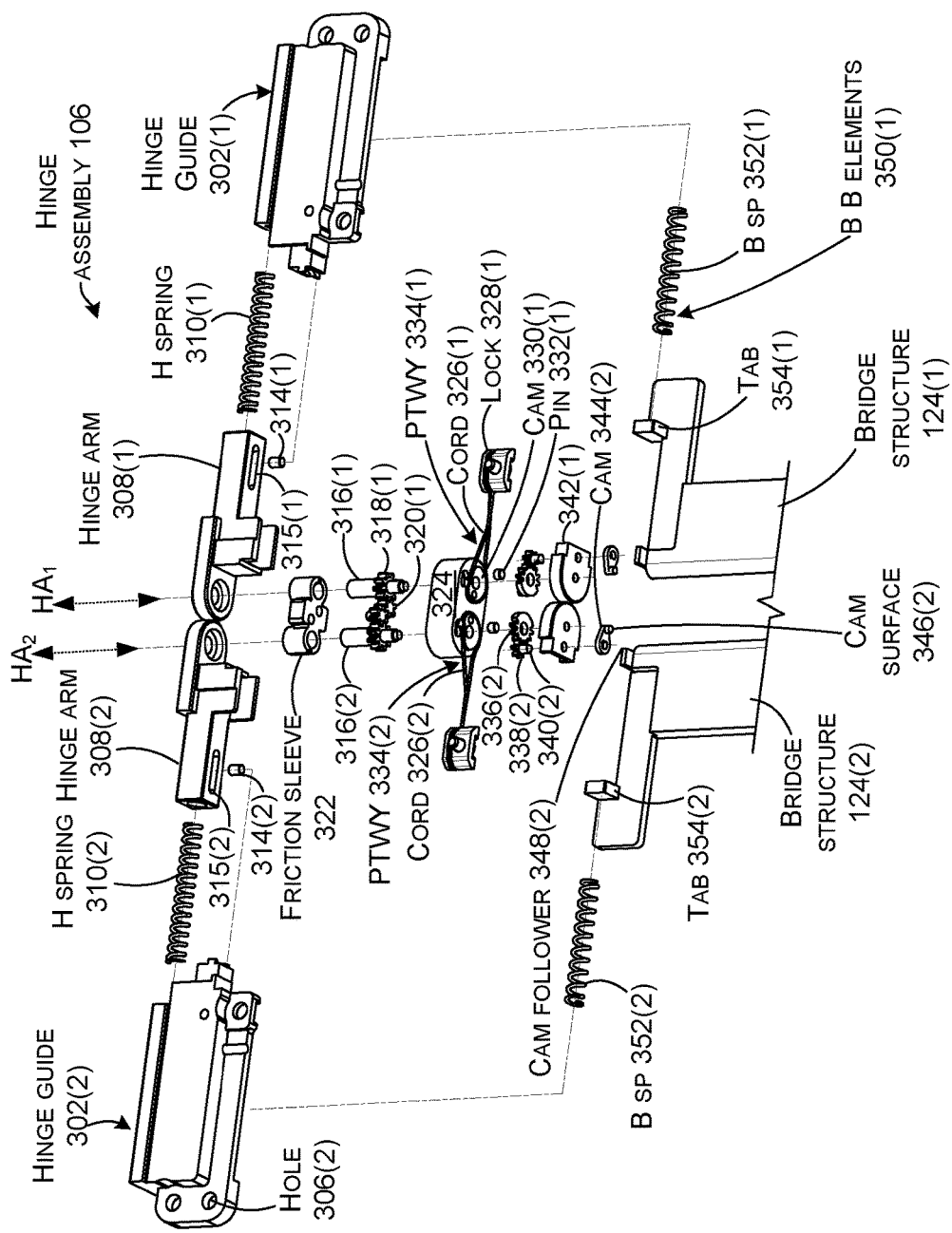

FIGS. 3A-3B are exploded perspective views that show hinge assembly 106 at the 180-degree orientation (as indicated in FIG. 2). FIGS. 4A-4G show a portion of hinge assembly 106 at the zero-degree orientation. FIGS. 5A-5G show a portion of hinge assembly 106 at the 180-degree orientation. FIGS. 6A-6G show a portion of hinge assembly 106 at the 360-degree orientation. Of course, these orientations are only representative. The present concepts described relative to these orientations also apply to intervening orientations.

Looking at FIGS. 3A and 3B, example hinge assembly 106 can include hinge guides 302 that can be secured to housings 114 of the first and second portions 102 and 104 (FIG. 1). For instance, the hinge guides 302 can be secured to the first and second portions 102 and 104 (FIG. 1) by fasteners 304 through holes 306 (not all of which are shown or designated with specificity). The hinge guides 302 can slideably receive hinge arms 308. A biasing element 309, such as hinge springs 310 can bias the hinge guides 302 and the hinge arms 308 apart (e.g., away) from one another. Stated another way, the hinge springs 310 can bias the hinge guides 302 and hence the first and second portions (FIGS. 1, 102 and 104) away from the hinge assembly 106. In this case, the hinge springs 310 can be received in cavities 312 in hinge arms 308. The hinge springs 310 can be guided by pins 314 that slide in and are constrained by slots 315.

The hinge arms 308 can receive hinge shafts 316 that define hinge axes (HA). The hinge shafts 316 can be associated with a timing element, such as timing gears. In this case, the timing gears include primary gears 318, which can interact with secondary gears 320. (An alternative implementation can omit the secondary gears and employ directly engaging primary gears). The primary and secondary gears can control rotation of the hinge arms 308 so that equal degrees of rotation occur around each hinge axis (HA). For instance, 20 degrees of rotation of hinge arm 308(1) around hinge axis $HA_1$ occurs concurrently with 20 degrees of rotation of hinge arm 308(2) around hinge axis $HA_2$.

The hinge shafts 316 can be positioned relative to a friction sleeve 322. The friction sleeve 322 can in turn be received in a communication member 324. The friction sleeve 322 can provide resistance to rotation between the communication member 324 and the hinge arms 308 so that the hinge arms maintain an orientation set by the user until the user changes the orientation (e.g., the device maintains whatever orientation the user puts it in).

Cords 326 can be secured between the communication member 324 (e.g., the hinge axes) and the first and second portions (e.g., in this case, the hinge guides 302). In this implementation, there are two cords 326: cord 326(1) relates to hinge axis $HA_1$ and hinge guide 302(1) and cord 326(2) relates to hinge axis $HA_2$ hinge guide 302(2). The cords 326 can be secured to the hinge guides 302, such as by locks 328. In some implementations, the cords 326 can extend around cams (e.g. cord cams) 330 and pins 332 associated with the communication member 324. The cams 330 and pins 332 can, at least in part, define pathways 334 for the cords 326.

The hinge shafts 316 can also engage a mechanism for controlling the position of the support member, such as bridge structures 124. In this case, the controlling mechanism entails primary cam gears or bridge gears 336 positioned on the hinge shafts 316. The primary cam gears 336 can engage secondary cam gears or bridge gears 338. The secondary cam gears 338 drive shafts 340, which pass through caps 342. In this case, the shafts 340 are parallel to, but not coextensive with the hinge axes. In other cases, the shafts can be coextensive with the hinge axes. The shafts 340 drive cams (e.g., bridge cams) 344. The primary cam gears 336 and secondary cam gears 338 can provide timed relation between the hinge shafts 316 and shafts 340 (and hence the cams 344).

In this case, the cams 344 are teardrop shaped and rotate around a large radius end of the teardrop shape and have cam surfaces (e.g., bearing surfaces) 346 on the smaller radius end. Cam surfaces 346 of the cams 344 can engage cam followers 348 on the bridge structures 124. (Note that in this implementation, the bearing surfaces 346 are positioned below the cams 344 in the x-reference direction (e.g., along the hinge axes). Thus, the bearing surfaces 346 lie in-line with the cam followers 348 and below the cams 344. This aspect is very difficult to illustrate in the 2D drawings that follow, such as FIGS. 4G, 5G, and 6G.)

Bridge biasing elements 350, such as bridge springs 352 can bias the bridge structures 124 toward one another (e.g., toward the hinge axes). In the illustrated configuration, the bridge springs 352 are positioned between the hinge guides 302 and tabs 354 on the bridge structures 124. The bridge springs 352 can bias the bridge structures together unless the bias is overcome by the cams 344 operating on the bridge structures 124.

FIGS. 4A-6G collectively illustrate the control aspects relating to the device length and the support element position examples. FIGS. 4A-4G show the device 100 at a zero-degree orientation, FIGS. 5A-5G show the device at a 180-degree orientation, and FIGS. 6A-6G show the device at a 360-degree orientation. In the zero-degree orientation, the flexible display 112 (shown in FIGS. 1 and 2) is facing inwardly (e.g., against itself). In the 360-degree orientation, the flexible display 112 is facing outwardly (e.g., on the outside of the device).

As mentioned above, FIGS. 4A-4G collectively show the device 100 in the zero-degree orientation with the flexible display 112 on the inside. To accommodate the flexible display, the effective length of the device underlying the flexible display can be decreased by forcing the hinge guides 302 (and thereby the first and second portions) toward the hinge assembly 106. In this case, the force can be accomplished by the cords 326 pulling the hinge guides 302 toward the hinge assembly as reflected by gap $GL_0$ (See, FIGS. 4A-4C) between the hinge guides 302 and the hinge arms 308. Recall that the hinge springs (310, FIGS. 3A and 3B) can bias the hinge guides away from the hinge arms 308 (and hence the hinge assembly). However, this bias can be overcome by the cords 326 when the cords experience relatively long pathways 334.

Figure 4A:
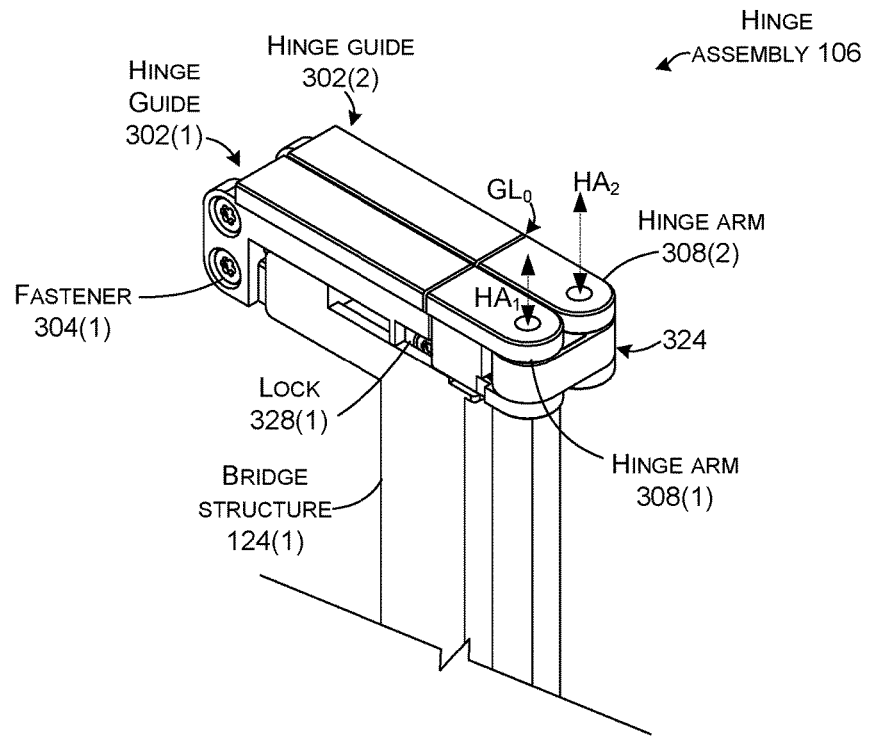
Figure 4B:
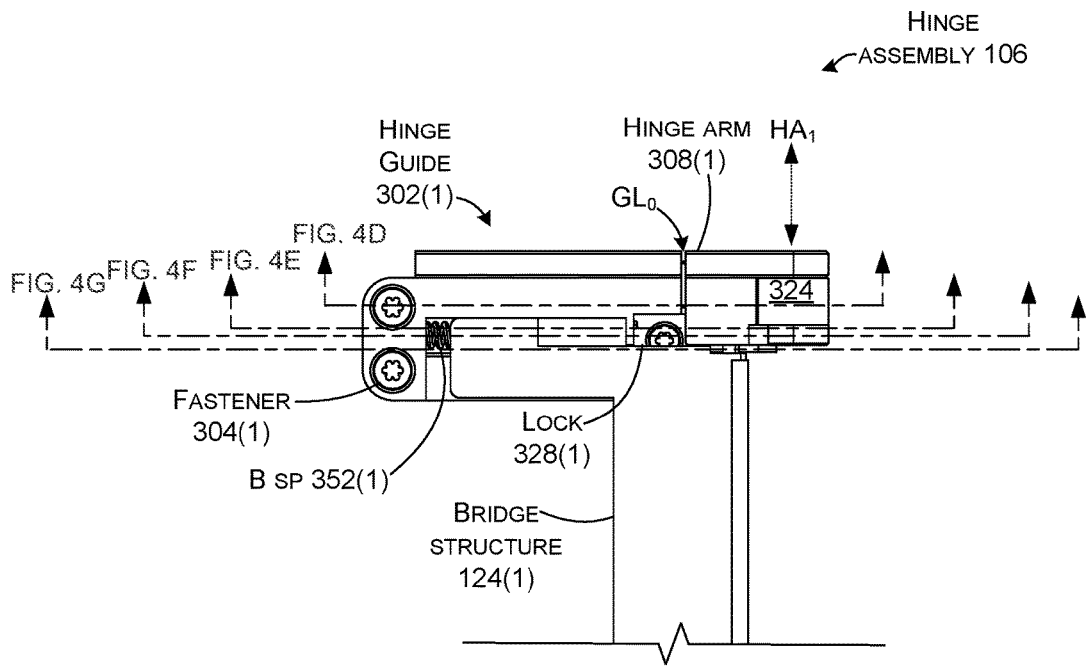
Figure 4C:
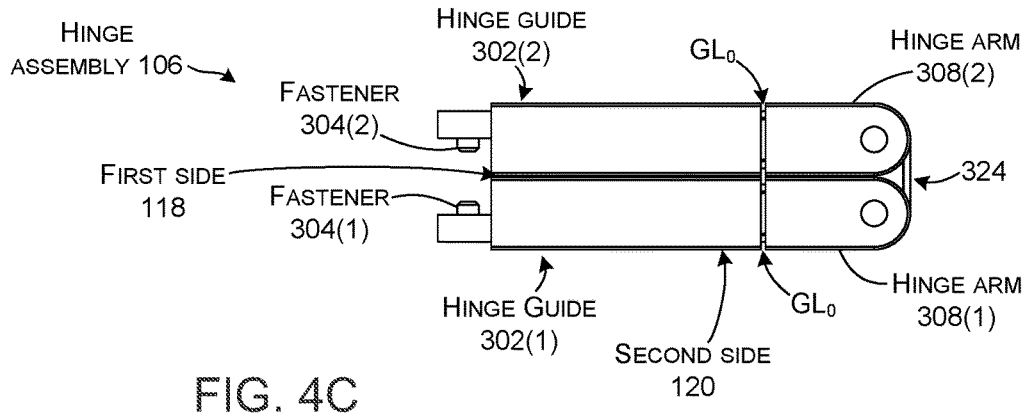
Figure 4D:
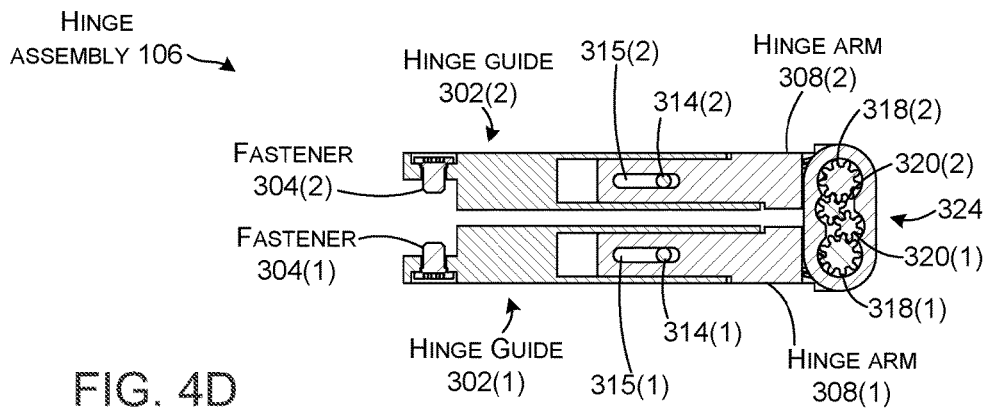
Figure 4E:
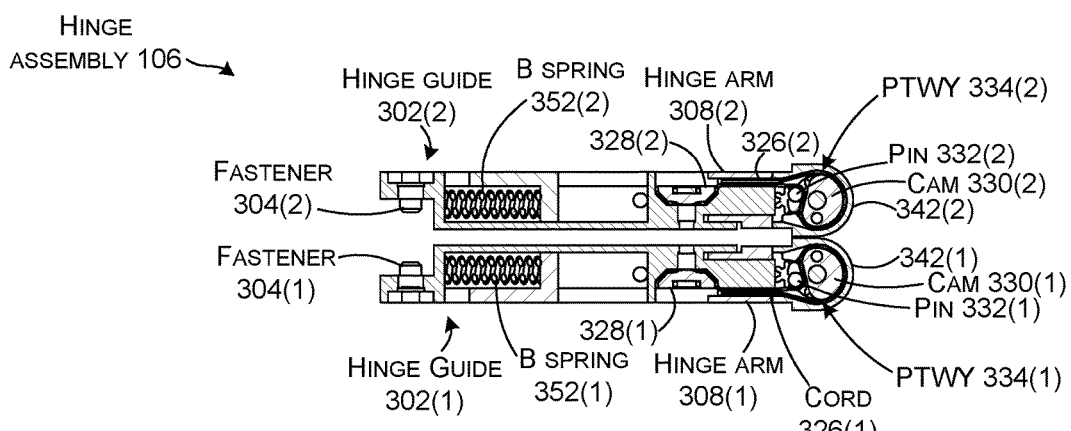

As mentioned above, the hinge springs 310 bias the hinge guides 302 and the hinge arms 308 away from one another. Movement of the hinge arms in the hinge guides can be facilitated and defined by pins 314 associated with the ends of the hinge springs 310. As shown in FIG. 4D, movement of the pins 314 can be defined by the slots 315 in the hinge arms. In this orientation, the hinge springs are compressed by cords 326 as evidenced by the pins 314 moving toward the hinge assembly (e.g., toward the end of slots 315 proximate to the communication member 324).

Moving the hinge guides 302 and hinge arms 308 away from one another serves to lengthen the device (e.g. the effective length). This bias can be countered by the cords 326 pulling the hinge guides 302 toward the hinge assembly 106. The extent that the cords 326 pull the hinge guides 302 depends upon the length of the pathways 334 experienced by the cords 326 at a given orientation. The pathways 334 can be affected, at least in part, by cams 330 (e.g., the orientation of the cams can change the length of the pathways). In some implementations, the cams 330 can be approximately D-shaped and can rotate around the hinge axes HA. In the zero-degree orientation of FIGS. 4A-4G, the pathways 334 are relatively long because they extend around the curved portion of the D-shape and include a 'jog' around pins 332.

In this implementation, the cords 326 are relatively inelastic. The cords 326 are attached to the hinge guides 302. When exposed to the relatively long pathways 334 of the zero-degree orientation, the cords overcome the bias of the hinge springs 310 and pull the hinge guides 302 partway toward the hinge assembly 106 (e.g., toward the communication member 324). This aspect can be evidenced by the gap $GL_0$ between the hinge guides 302 and the hinge arms 308 (e.g., gap length at orientation zero ($GL_0$)) being relatively small.

Figure 4F:
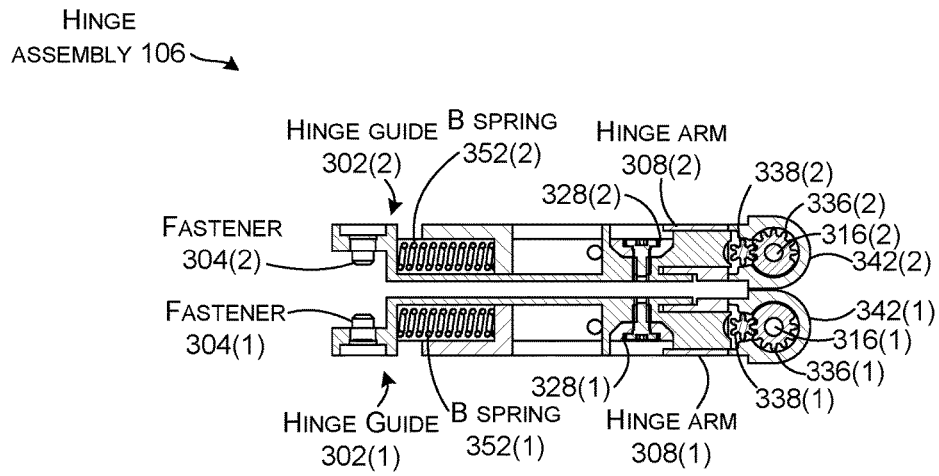
Figure 4G:
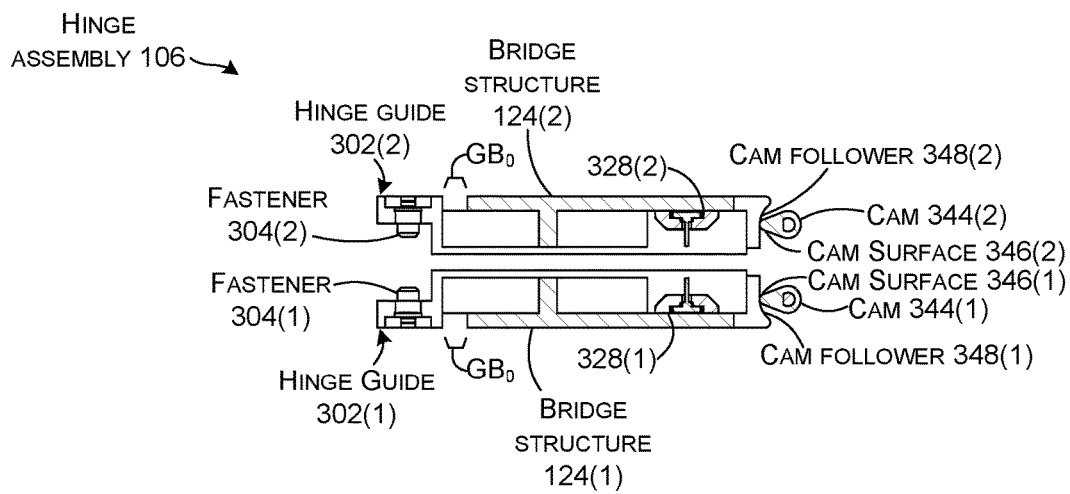
Figure 5C:
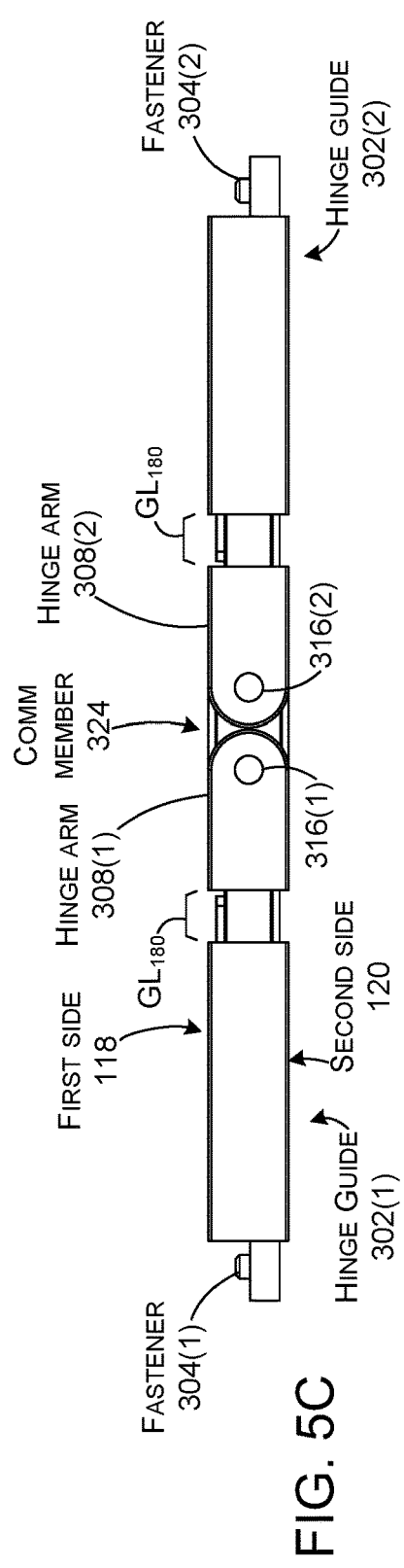
Figure 5D:
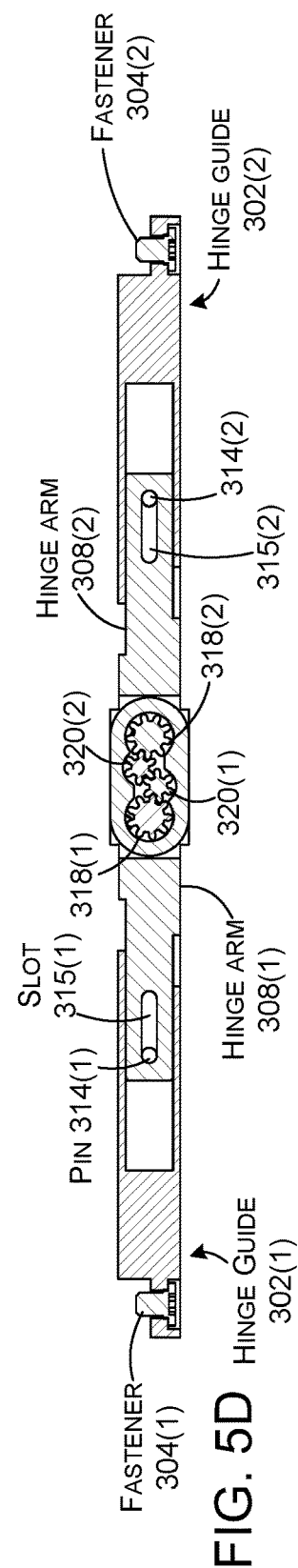

FIGS. 4F and 4G show how the position of the bridge structures 124 can be controlled based upon orientation of the first and second portions. In this case, the primary cam gears 336 are secured to the hinge shafts 316. The primary cam gears 336 intermesh with the secondary cam gears 338. The secondary cam gears 338 drive shafts 340, which are keyed to cams 344. In this orientation, cams 344 are facing toward the hinge guides 302 and engaging the cam followers 348 on the bridge structures 124. This engagement can overcome bias created by bridge springs 352 that is biasing the bridge structures 124 toward the hinge axes HA. Instead, the cam engagement can force the bridge structures 124 away from the hinge axes and compress the bridge springs 352 as evidenced by bridge structure to hinge guide gap $GB_0$ (FIG. 4G). This can move the bridge structures away from the hinge assembly and allow more room for 'bending' of the flexible display (e.g., allows bigger bend radius of flexible display).

FIGS. 5A-5G show the device in the 180-degree orientation similar to FIGS. 1 and 2. While not shown, the flexible display (112, FIG. 1) would be on the opposite side of the hinge assembly 106 as the reader.

FIG. 5E shows pathways 334 shortened relative to the zero-degree orientation of FIGS. 4A-4G. Namely, the cams 330 have rotated so that the portion of the pathways defined by the cams are shorter. Further, pins 332 are not extending the pathways as they were in the zero-degree orientation. With the shorter pathways 334 experienced by cords 326, the cords can allow the hinge springs 310 (FIGS. 3A and 3B) to bias the hinge guides 302 away from the hinge arms 308. This can be evidenced in FIG. 5D by pins 314 moving in slots 315 away from the hinge assembly as the hinge springs expand to bias the hinge guides 302 away from the hinge assembly 106. Biasing the hinge guides 302 away from the hinge arms 308 can effectively increase the length of the device underlying the flexible display. This increased length can be evidenced by comparing gap $GL_{180}$ to gap $GL_0$ of FIGS. 4A-4C.

FIG. 5F shows primary cam gears 336 positioned on hinge shafts 316. The primary cam gears 336 can drive secondary cam gears 338. FIG. 5G shows the secondary cam gears can drive cams 344 via shafts 340. In the 180-degree orientation, the cam 344 are facing away from the hinge guides 302 (e.g., towards one another). This allows the cam followers 348 of the bridge structures 124 to be biased toward one another (e.g., toward the hinge assembly) by the bridge springs 352. This can be evidenced by comparing the bridge gap ($GB_{180}$) at the 180-degree orientation to the zero-degree orientation (e.g., $GB_0$ of FIG. 4G). Thus, the bridge structures 124 can move toward one another and toward the hinge assembly 106 to support the flexible display. Recall that in the 180-degree orientation, the bridge structures support of the flexible display can contribute to a uniform tactile feel of the flexible display across the device (e.g., from distal end 110(1) to distal end 110(2) in FIG. 1).

FIGS. 6A-6G show the device in the 360-degree orientation. Though not shown so that underlying components can be visualized, in this orientation the flexible display is wrapped around the device like a book cover of a closed book. To accommodate this configuration, the effective length of the device can be shortened as reflected in gap $GL_{360}$ which can be compared to the longer gap $GL_{180}$ of FIGS. 5A-5C. The shortening of the effective length can be accomplished by pathways 334 being longer in the 360-degree orientation than the 180-degree orientation. The length of the pathways 334 can be determined at least in part by the cams 330. The length of the cams over which the cords 326 pass is longer in the 360-degree orientation than in the 180-degree orientation. The longer pathways 334 of the 360-degree orientation causes the cords 326 to overcome the bias of the hinge springs 310 and pull the hinge guides 302 toward the hinge arms 308 as reflected by gap GL 360.

Figure 6A:
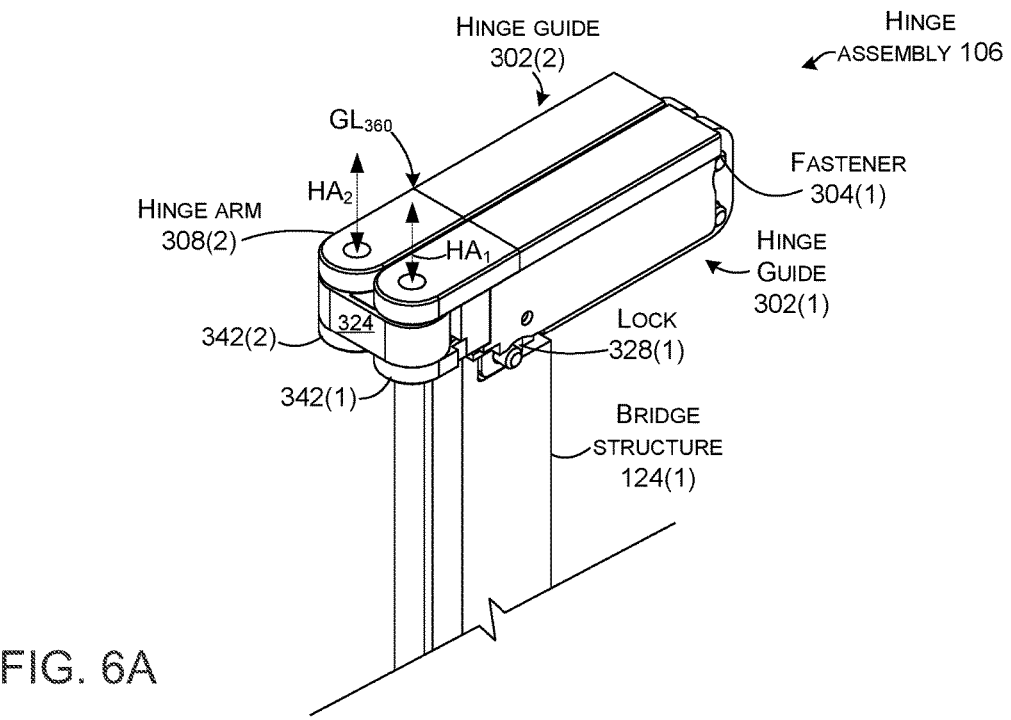
Figure 6B:
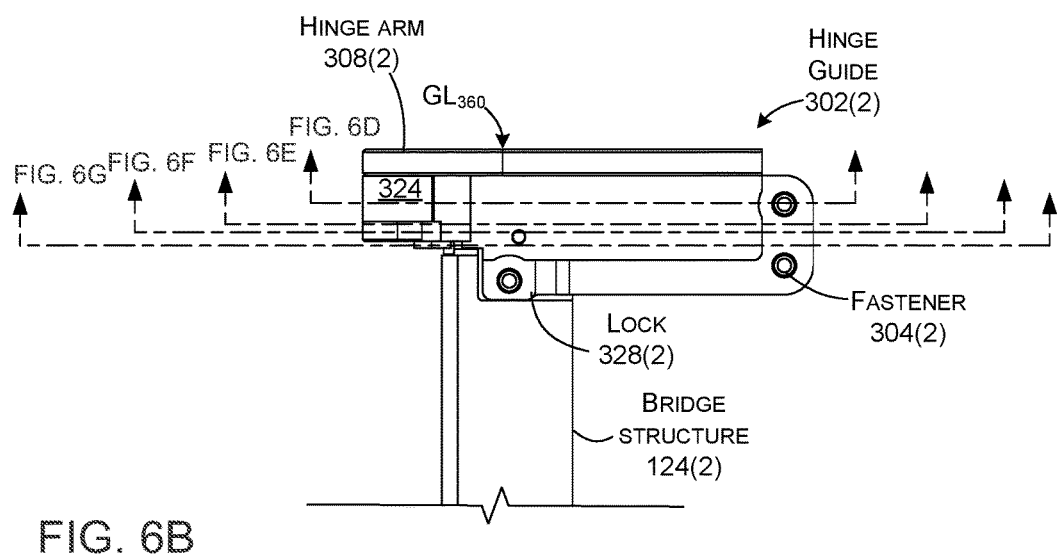
Figure 6C:
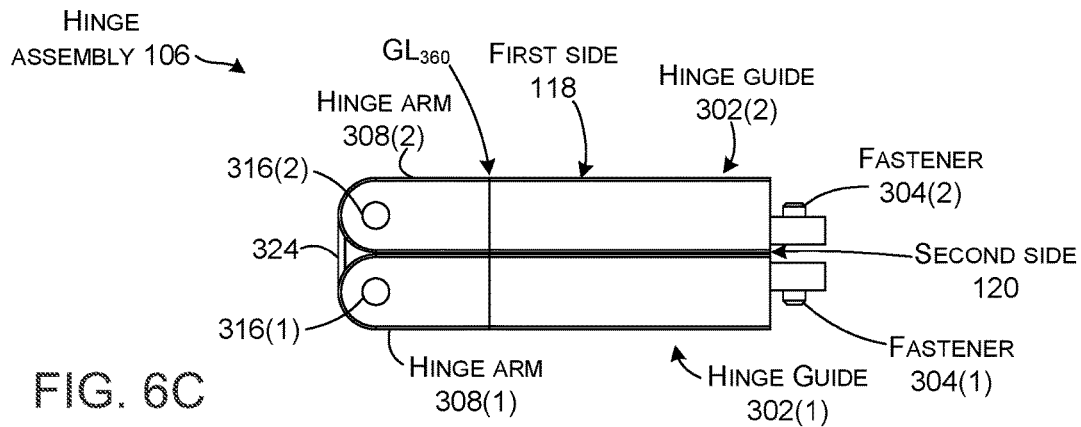
Figure 6D:
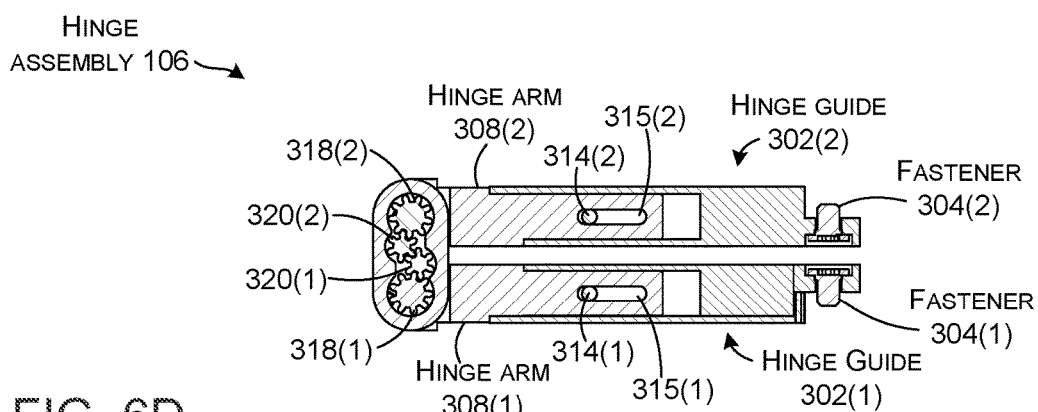
Figure 6E:
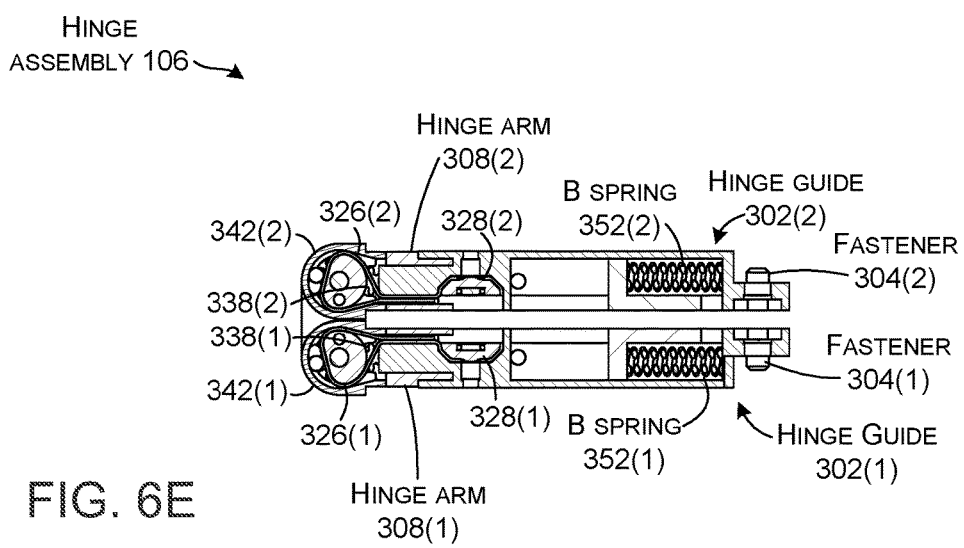
Figure 6F:
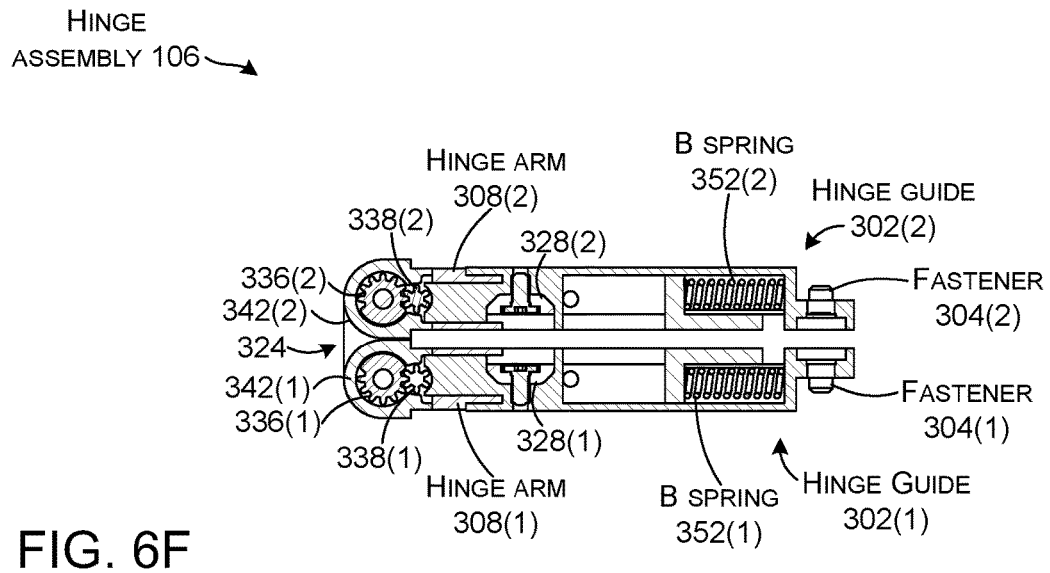
Figure 6G:

FIG. 6G shows that cams 344 can force the bridge structures 124 away from the hinge assembly 106 (e.g., away from the hinge axes) in this orientation. Moving the bridge structures 124 away from the hinge assembly 106 can prevent the bridge structures from interfering with hinge assembly functionalities and/or prevent the bridge structures from contacting the flexible display in this orientation.

Individual elements of the hinge assemblies 106 can be made from various materials, such as metals, plastics, foams, polymers, and/or composites. These materials can be prepared in various ways, such as in the form of sheet metals, die cast metals, machined metals, metal injection moldings, 3D printed materials, molded or 3D printed plastics, and/or molded or 3D printed composites, among others, or any combination of these (and/or other) materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-6G.

Various examples are described above. Additional examples are described below. One example includes a device that has a first portion and a second portion and a hinge assembly. The hinge assembly is slideably secured to the first portion and the second portion. The hinge assembly defines a pathway and a bridge cam. The device includes a flexible display secured to the first portion and the second portion, a bridge structure positioned relative to the hinge assembly and the flexible display, and a cord that extends along the pathway between the hinge assembly and the first portion and that is configured to control a gap between the first portion and the hinge assembly depending upon an orientation of the first and second portions. The bridge cam is configured to control a position of the bridge structure depending upon the orientation of the first and second portions and the bridge cam controls the bridge structure independently of the cord controlling the gap.

Another example can include any of the above and/or below examples where the hinge assembly defines a cord cam and wherein the pathway is defined at least in part by the cord cam.

Another example can include any of the above and/or below examples where the hinge assembly defines a hinge shaft that the first portion rotates around.

Another example can include any of the above and/or below examples where the bridge cam operates in timed relation to the hinge shaft.

Another example can include any of the above and/or below examples where the device further comprises bridge gears positioned relative to the hinge shaft to provide the timed relation.

Another example can include any of the above and/or below examples where the device further comprises bridge biasing elements that bias the bridge structure towards the hinge assembly.

Another example can include any of the above and/or below examples where the bridge cam can engage the bridge structure at individual orientations to force the bridge structure away from the hinge assembly.

Another example can include any of the above and/or below examples where the cord comprises a first cord extending between the hinge assembly and the first portion and a second cord extending between the hinge assembly and the second portion.

Another example includes a device comprising hinged first and second portions that rotate around a hinge axis, a flexible display positioned over the first and second portions, a cord that determines a length of the hinged first and second portions relative to the flexible display depending on an orientation of the first and second portions, and a cam that controls a position of a support under the flexible display depending on the orientation.

Another example can include any of the above and/or below examples where the device further comprises a biasing element that biases the first portion away from the hinge axis.

Another example can include any of the above and/or below examples where the device defines a pathway for the cord and wherein the length of the hinged first and second portions is defined at least in part by a length of the pathway at the orientation.

Another example can include any of the above and/or below examples where the support comprises a bridge that includes a cam follower and wherein the cam is configured to operate on the cam follower to control the position of the bridge.

Another example can include any of the above and/or below examples where the device further comprises a structure that defines a pathway for the cord and wherein a length of the pathway changes when the orientation changes.

Another example can include any of the above and/or below examples where the structure comprises a cord cam.

Another example can include any of the above and/or below examples where the cord cam is D-shaped.

Another example can include any of the above and/or below examples where the first and second portions rotate around an axis of rotation.

Another example can include any of the above and/or below examples where the cam rotates around the axis of rotation or wherein the cam rotates around another axis that is parallel to the axis or rotation.

Another example can include any of the above and/or below examples where the cam is teardrop shaped and defines a cam surface that engages a cam follower defined by the support.

Another example includes a device comprising first and second portions configured to rotate relative to a hinge axis, a flexible display positioned over the first and second portions, a cord that pulls the hinged first and second portions toward one another to an extent defined by an orientation of the first and second portions, and a cam that forces a support away from the hinge axis unless the orientation is 180 degrees.

Another example can include any of the above and/or below examples where the extent is determined by a pathway experienced by the cord at the orientation.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
   a first portion and a second portion;
   a hinge assembly slideably secured to the first portion and the second portion, the hinge assembly defining a pathway and a bridge cam;
   a flexible display secured to the first portion and the second portion;
   a bridge structure positioned relative to the hinge assembly and the flexible display;
   a cord that extends along the pathway between the hinge assembly and the first portion and that is configured to control a gap between the first portion and the hinge assembly depending upon an orientation of the first and second portions; and,
   the bridge cam is configured to control a position of the bridge structure depending upon the orientation of the first and second portions and the bridge cam controls the bridge structure independently of the cord controlling the gap.

2. The device of claim 1, wherein the hinge assembly defines a cord cam and wherein the pathway is defined at least in part by the cord cam.

3. The device of claim 1, wherein the hinge assembly defines a hinge shaft that the first portion rotates around.

4. The device of claim 3, wherein the bridge cam operates in timed relation to the hinge shaft.

5. The device of claim 4, further comprising bridge gears positioned relative to the hinge shaft to provide the timed relation.

6. The device of claim 5, further comprising bridge biasing elements that bias the bridge structure towards the hinge assembly.

7. The device of claim 6, wherein the bridge cam can engage the bridge structure at individual orientations to force the bridge structure away from the hinge assembly.

8. The device of claim 1, wherein the cord comprises a first cord extending between the hinge assembly and the first portion and a second cord extending between the hinge assembly and the second portion.

9. A device, comprising:
   hinged first and second portions that rotate around a hinge axis;

a flexible display positioned over the first and second portions;

a cord that determines a length of the hinged first and second portions relative to the flexible display depending on an orientation of the first and second portions; and, a cam that controls a position of a support under the flexible display depending on the orientation.

10. The device of claim 9, further comprising a biasing element that biases the first portion away from the hinge axis.

11. The device of claim 10, wherein the device defines a pathway for the cord and wherein the length of the hinged first and second portions is defined at least in part by a length of the pathway at the orientation.

12. The device of claim 9, wherein the support comprises a bridge that includes a cam follower and wherein the cam is configured to operate on the cam follower to control the position of the bridge.

13. The device of claim 9, further comprising a structure that defines a pathway for the cord and wherein a length of the pathway changes when the orientation changes.

14. The device of claim 13, wherein the structure comprises a cord cam.

15. The device of claim 14, wherein the cord cam is D-shaped.

16. The device of claim 9, wherein the first and second portions rotate around an axis of rotation.

17. The device of claim 16, wherein the cam rotates around the axis of rotation or wherein the cam rotates around another axis that is parallel to the axis or rotation.

18. The device of claim 17, wherein the cam is teardrop shaped and defines a cam surface that engages a cam follower defined by the support.

19. A device, comprising:

first and second portions configured to rotate relative to a hinge axis;

a flexible display positioned over the first and second portions;

a cord that pulls the hinged first and second portions toward one another to an extent defined by an orientation of the first and second portions; and, a cam that forces a support away from the hinge axis unless the orientation is 180 degrees.

20. The device of claim 19, wherein the extent is determined by a pathway experienced by the cord at the orientation.

* * * * *